(12) United States Patent
Okamoto et al.

(10) Patent No.: US 9,296,921 B2
(45) Date of Patent: *Mar. 29, 2016

(54) CONDUCTIVE POLYMER COMPOSITION AND PROCESS FOR PREPARING THE SAME

(75) Inventors: Syuji Okamoto, Sayama (JP); Fumiaki Kobayashi, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 986 days.

This patent is subject to a terminal disclaimer.

(21) Appl. No.: 13/382,611

(22) PCT Filed: Jul. 7, 2010

(86) PCT No.: PCT/JP2010/061510
§ 371 (c)(1),
(2), (4) Date: Jan. 6, 2012

(87) PCT Pub. No.: WO2011/004831
PCT Pub. Date: Jan. 13, 2011

(65) Prior Publication Data
US 2012/0097900 A1  Apr. 26, 2012

(30) Foreign Application Priority Data
Jul. 8, 2009 (JP) .................. 2009-162181

(51) Int. Cl.
| | |
|---|---|
| *H01B 1/00* | (2006.01) |
| *C09D 179/02* | (2006.01) |
| *H01B 1/12* | (2006.01) |
| *C08G 61/12* | (2006.01) |
| *C08G 73/02* | (2006.01) |
| *C08L 65/00* | (2006.01) |
| *C08L 101/12* | (2006.01) |

(52) U.S. Cl.
CPC ............ *C09D 179/02* (2013.01); *C08G 61/124* (2013.01); *C08G 61/126* (2013.01); *C08G 73/0266* (2013.01); *C08L 65/00* (2013.01); *C08L 101/12* (2013.01); *H01B 1/124* (2013.01); *C08G 2261/3221* (2013.01); *C08G 2261/3223* (2013.01); *C08G 2261/43* (2013.01); *C08G 2261/51* (2013.01); *C08G 2261/91* (2013.01); *C08L 2203/20* (2013.01)

(58) Field of Classification Search
None
See application file for complete search history.

(56) References Cited

U.S. PATENT DOCUMENTS

| | | |
|---|---|---|
| 7,112,368 B2 | 9/2006 | Hsu |
| 7,455,794 B2 | 11/2008 | Abe |
| 7,582,403 B2 | 9/2009 | Bailey et al. |
| 7,811,477 B2 | 10/2010 | Lee et al. |
| 7,875,208 B2 | 1/2011 | Huh et al. |
| 7,990,684 B2 | 8/2011 | Sugihara et al. |
| 9,034,211 B2 * | 5/2015 | Meguro et al. ............... 252/500 |
| 2003/0023012 A1 | 1/2003 | Okamoto et al. |
| 2006/0261332 A1 | 11/2006 | Lee et al. |
| 2007/0096066 A1 | 5/2007 | Yoshida et al. |
| 2008/0105854 A1 | 5/2008 | Huh et al. |
| 2010/0282308 A1 | 11/2010 | Okamoto |
| 2011/0026120 A1* | 2/2011 | Suzuki et al. ............... 359/580 |
| 2011/0309308 A1 | 12/2011 | Meguro et al. |

FOREIGN PATENT DOCUMENTS

| | | |
|---|---|---|
| CN | 101302340 A | 11/2008 |
| EP | 1634922 A1 | 3/2006 |
| EP | 2399958 A1 | 12/2011 |
| JP | 2000344823 A | 12/2000 |
| JP | 2001106782 A | 4/2001 |
| JP | 2004307722 A | 11/2004 |
| JP | 2005508418 A | 3/2005 |
| JP | 3906071 B2 | 1/2007 |
| JP | 2007126507 A | 5/2007 |
| JP | 4035353 B2 | 11/2007 |
| JP | 2008045061 A | 2/2008 |
| JP | 2008121014 A | 5/2008 |
| JP | 2008179809 A | 8/2008 |
| TW | 200736294 | 10/2007 |
| WO | 2008010978 A2 | 1/2008 |
| WO | 2009013942 A1 | 1/2009 |
| WO | 2009131012 A1 | 10/2009 |

OTHER PUBLICATIONS

Tsutsumi et al., "Electrochemical behavior of polyaniline composite doped with poly[p-styrenesulfonate-co-methoxyoligo (ethyleneglycol) acrylate] in aqueous electrolyte and its application to the lithium ion concentration battery", Synthetic Metals, 1998, vol. 97, pp. 53-56.

\* cited by examiner

*Primary Examiner* — Mark Kopec
*Assistant Examiner* — Jaison Thomas
(74) *Attorney, Agent, or Firm* — The Webb Law Firm

(57) ABSTRACT

A conductive polymer composition which can be homogeneously dissolved in a solvent and can form a smooth film. The conductive polymer composition is a conductive polymer composition comprising a polymer compound (A) and a π-conjugated polymer (β), wherein the polymer compound (A) is a polymer compound obtained by polymerizing 10 to 50% by mol of a monomer (a-1) having a sulfonic acid group or a sulfonate group, 10 to 90% by mol of a monomer (a-2) having chelating ability and 0 to 70% by mol of other monomer (a-3), and the π-conjugated polymer (β) is a π-conjugated polymer obtained by polymerizing at least one monomer selected from monomers represented by the following formulas (I) to (III).

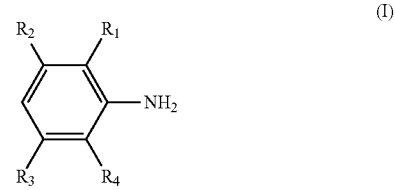

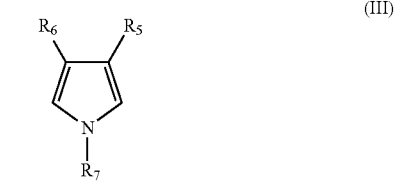

8 Claims, 2 Drawing Sheets

__US 9,296,921 B2__

CONDUCTIVE POLYMER COMPOSITION AND PROCESS FOR PREPARING THE SAME

TECHNICAL FIELD

The present invention relates to a conductive polymer composition and a process for preparing the same. More particularly, the present invention relates to a conductive polymer composition containing a π-conjugated polymer and a process for preparing the same.

BACKGROUND ART

In order to impart higher conductivity to π-conjugated polymers, doping of the π-conjugated polymers with dopants have been carried out.

By the way, polymers in which π-conjugation has been developed inherently have high flatness of polymer chain and have high crystallizability (stacking property) between polymer chains due to affinity of π-bonds. When such a π-conjugated polymer is doped with a dopant, the above flatness and crystallizability are more enhanced. On this account, solubility (solubility due to heat or solvent) of the π-conjugated polymer doped with a dopant is usually lowered.

Therefore, it is known that reconciliation of high electrical conductivity and high solubility (solubility due to heat or solvent) with each other in the π-conjugated polymer is difficult.

In this connection, an attempt to prepare conductive polyaniline improved in solubility has been made in Japaneses Patent No. 4,035,353 ("JP-'353"). More specifically, a monomer of polyaniline is reacted with a surfactant agent comprising a metal sulfonate, ammonium sulfonate or phosphoric acid ester having a repeating unit of alkylene ether in its molecular structure in an aqueous solution to form an aniline-surfactant agent salt of an amphipathic structure, and this salt is subjected to oxidation polymerization as a monomer. Subsequently, to an aqueous solution of the conductive polyaniline obtained, a ketone-based solvent or an aromatic solvent is added to separate a supernatant liquid, and in the supernatant liquid, the conductive polyaniline and the solvent are compatibilized with each other to prepare a conductive polyaniline solution for forming a conductive coating film.

In the conductive polyaniline solution prepared in the above mentioned JP-'353, however, there is a problem that particulate conductive polyaniline remains and is not homogeneously dissolved. Further, there is another problem that when a film is formed from the solution containing the particulate conductive polyaniline, unevenness was observed.

A π-conjugated polymer doped with a dopant is favorably used as a component for forming an electrolyte polymer layer of a dye-sensitized solar cell. The dye-sensitized solar cell usually has a laminated structure in which a transparent substrate, a light-transmitting electrode, a metal oxide layer having a dye supported thereon, an electrolyte polymer layer, a counter electrode and a counter electrode substrate are laminated in this order (see, for example, International Publication No. 013942/2009 Pamphlet). The electrolyte polymer layer contains a π-conjugated polymer doped with a dopant and an ionic compound having an ionic species replaceable with a dopant ionic species of the dopant. In the course of generation of electromotive force by the dye-sensitized solar cell, the above species are replaced with each other in the electrolyte polymer layer to transfer charge. For actually forming the electrolyte polymer layer, the π-conjugated polymer doped with a dopant and the ionic compound are blended with a solvent to prepare a solution. However, if the conductive polyaniline solution prepared in the aforementioned JP-'353 is used and if an ionic compound is blended, there arises a problem that the conductive polyaniline is aggregated and precipitated. In this case, a film of unevenness is only formed, and such a film cannot constitute a dye-sensitized solar cell.

Also in a conductive polymer composition in which a dopant and a π-conjugated polymer are contained but the dopant is not incorporated into the π-conjugated polymer, there are problems of such solubility as above and stability of the resulting solution.

Accordingly, it is an object of the present invention to provide a conductive polymer composition which can be homogeneously dissolved in a solvent and can form a smooth film. Moreover, it is an object of the present invention to provide a conductive polymer composition which is free from aggregation even if an ionic compound is added to a solvent together with this conductive polymer composition, and can form a smooth film. In other words, it is an object of the present invention to provide a conductive polymer composition capable of forming a solution of high stability.

SUMMARY OF THE INVENTION

The conductive polymer composition of the present invention is a conductive polymer composition comprising a polymer compound (A) and a π-conjugated polymer (β), wherein the polymer compound (A) is a polymer compound obtained by polymerizing 10 to 50% by mol of a monomer (a-1) having a sulfonic acid group or a sulfonate group, 10 to 90% by mol of a monomer (a-2) having chelating ability and 0 to 70% by mol of other monomer (a-3), the total amount of said monomers (a-1) to (a-3) being 100% by mol, and the π-conjugated polymer (β) is a π-conjugated polymer obtained by polymerizing at least one monomer selected from monomers represented by the following formulas (I) to (III):

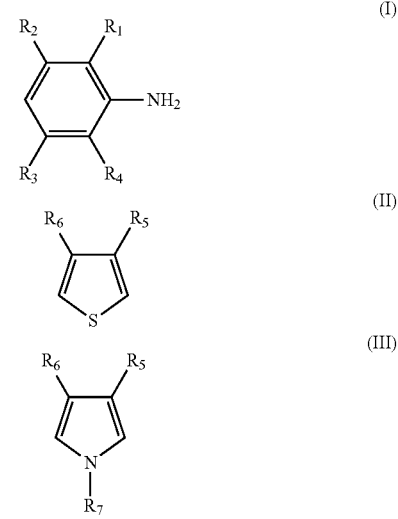

wherein $R_1$ to $R_6$ are each independently a hydrogen atom, an alkyl group of 1 to 12 carbon atoms or an alkoxy group of 1 to 10 carbon atoms, $R_7$ is a hydrogen atom, an alkyl group of 1 to 12 carbon atoms or an aromatic group, and $R_5$ and $R_6$ may be bonded to each other to form an alkylenedioxy group of 1 to 8 carbon atoms.

The conductive polymer composition is preferably obtained by doping the π-conjugated polymer (β) with the polymer compound (A).

The conductive polymer composition is more preferably obtained by polymerizing at least one monomer selected from the monomers represented by the above formulas (I) to (III) in an electrolytic solvent in the presence of the polymer compound (A) and an oxidizing agent to form the π-conjugated polymer (β) and to simultaneously dope the π-conjugated polymer (β) with the polymer compound (A).

The monomer (a-2) having chelating ability is preferably a monomer having a pyridyl group or a phenanthroline structure, or a monomer having a group represented by the following formula (IV) or a group represented by the following formula (V):

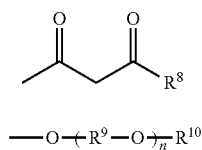

(IV)

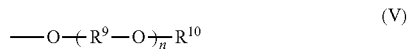

(V)

wherein $R^8$ is an alkyl group of 1 to 4 carbon atoms, $R^9$ is an ethylene group, $R^{10}$ is an alkyl group of 1 to 4 carbon atoms, and n is an integer of 1 to 5.

The other monomer (a-3) is preferably a (meth)acrylic monomer.

The process for preparing a conductive polymer composition of the present invention is a process for preparing a conducive polymer composition, comprising polymerizing at least one monomer selected from monomers represented by the following formulas (I) to (III) in an electrolytic solvent in the presence of a polymer compound (A), which is obtained by polymerizing 10 to 50% by mol of a monomer (a-1) having a sulfonic acid group or a sulfonate group, 10 to 90% by mol of a monomer (a-2) having chelating ability and 0 to 70% by mol of other monomer (a-3), the total amount of said monomers (a-1) to (a-3) being 100% by mol, and an oxidizing agent to form a π-conjugated polymer (β) and to simultaneously dope the π-conjugated polymer (β) with the polymer compound (A),

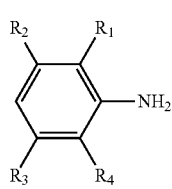

(I)

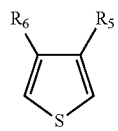

(II)

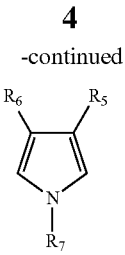

(III)

wherein $R_1$ to $R_6$ are each independently a hydrogen atom, an alkyl group of 1 to 12 carbon atoms or an alkoxy group of 1 to 10 carbon atoms, $R_7$ is a hydrogen atom, an alkyl group of 1 to 12 carbon atoms or an aromatic group, and $R_5$ and $R_6$ may be bonded to each other to form an alkylenedioxy group of 1 to 8 carbon atoms.

In the above preparation process, the monomer (a-2) having chelating ability is preferably a monomer having a pyridyl group or a phenanthroline structure, or a monomer having a group represented by the following formula (IV) or a group represented by the following formula (V):

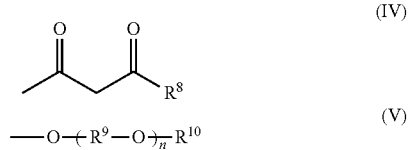

(IV)

(V)

wherein $R^8$ is an alkyl group of 1 to 4 carbon atoms, $R^9$ is an ethylene group, $R^{10}$ is an alkyl group of 1 to 4 carbon atoms, and n is an integer of 1 to 5.

The other monomer (a-3) is preferably a (meth)acrylic monomer.

The conductive polymer composition comprising a dopant and a π-conjugated polymer of the present invention can be homogeneously dissolved in a solvent and can form a smooth film. Moreover, even if an ionic compound is added to a solvent together with this conductive polymer composition, aggregation of the π-conjugated polymer does not take place, and a smooth film can be formed. In other words, the conductive polymer composition comprising a dopant and a π-conjugated polymer of the present invention can form a solution of high stability.

DETAILED DESCRIPTION OF THE INVENTION

Figure 1:
FIG. 1 is a view to explain conductive polymer compositions of an example and a comparative example.

The conductive polymer composition of the present invention is described in more detail hereinafter. In the present specification, (meth)acryl means acryl or methacryl, (meth)acryloyl means acryloyl or methacryloyl, and (meth)acrylate means acrylate or methacrylate.

The conductive polymer composition of the present invention comprises a polymer compound (A) and a π-conjugated polymer (β). In other words, the conductive polymer composition of the present invention is a composition obtained by doping a π-conjugated polymer (β) with a polymer compound (A), or a composition in which a polymer compound (A) and a π-conjugated polymer (β) are contained but the polymer compound (A) is not incorporated into the π-conjugated polymer (β). In the present specification, the "composition obtained by doping a π-conjugated polymer (β) with a polymer compound (A)" is also referred to simply as a "π-conjugated polymer (β) doped with a polymer compound (A)" or a "doped π-conjugated polymer (β)".

First, the π-conjugated polymer (β) doped with the polymer compound (A) is described.

The π-conjugated polymer (β) doped with the polymer compound (A) as a dopant is usually prepared by polymerizing at least one monomer selected from monomers represented by the following formulas (I) to (III) in an electrolytic solvent in the presence of a polymer compound (A) and an oxidizing agent to form a π-conjugated polymer (β) and to simultaneously dope the π-conjugated polymer (β) with the polymer compound (A), as described later.

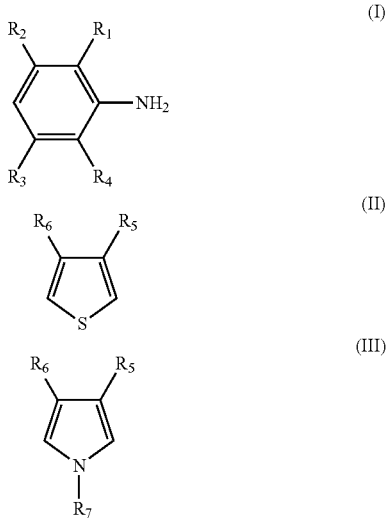

The polymer compound (A) is a polymer compound obtained by polymerizing a monomer (a-1) having a sulfonic acid group or a sulfonate group, a monomer (a-2) having chelating ability, and if necessary, other monomer (a-3), as described later. In the present specification, the "monomer (a-1) having a sulfonic acid group or a sulfonate group", the "monomer (a-2) having chelating ability" and the "other monomer (a-3)" are also referred to simply as a "monomer (a-1)", a "monomer (a-2)" and a "monomer (a-3)", respectively.

When the polymer compound (A) is allowed to exist in the preparation of the π-conjugated polymer (β), the polymer compound (A) becomes incorporated as a dopant into the π-conjugated polymer (β), and hence, the resulting doped π-conjugated polymer (β) has high conductivity.

Moreover, stacking of the formed π-conjugated polymer (β) is lowered because of the steric hindrance of the polymer compound (A), and hence, the finally obtained doped π-conjugated polymer (β) has high solubility (solubility due to heat or solvent). The polymer compound (A) is a compound obtained by polymerizing the monomer (a-1) and if necessary the monomer (a-3), and hence, the property concerning hydrophobicity or hydrophilicity has been already controlled. This also contributes to excellent solubility of the doped π-conjugated polymer (β).

Furthermore, the polymer compound (A) is a compound obtained by polymerizing the monomer (a-2), and hence, even if the finally obtained doped π-conjugated polymer (β) is blended with a solvent together with an ionic compound, aggregation of the π-conjugated polymer (β) is inhibited. This mechanism is presumed to be attributable to that the monomer (a-2) can coordinate to the ionic species (cationic species) of the ionic compound to incorporate it because the monomer (a-2) has chelating ability.

In the doped π-conjugated polymer (β), high electrical conductivity and high solubility (solubility due to heat or solvent) are reconciled with each other, as described above. Moreover, the solution obtained from the π-conjugated polymer (β) has high stability.

The polymer compound (A) that is allowed to exist when the π-conjugated polymer (β) is prepared also exerts a function to form a homogeneous polymerization field as an emulsifying agent.

The polymer compound (A) for use in the present invention is a polymer compound obtained by polymerizing the monomer (a-1) having a sulfonic acid group or a sulfonate group and the monomer (a-2) having chelating ability in a specific ratio or a polymer compound obtained by polymerizing the monomer (a-1) having a sulfonic acid group or a sulfonate group, the monomer (a-2) having chelating ability and other monomer (a-3) in a specific ratio.

The monomer (a-1) having a sulfonic acid group or a sulfonate group is preferably a monomer having a sulfonic acid group or a sulfonate group and having a polymerizable vinyl group. The monomer (a-1) may be used singly or as a mixture of two or more kinds. The monomer (a-1) may have both a sulfonic acid group and a sulfonate group.

Examples of such monomers (a-1) include styrenesulfonic acid; styrenesulfonates, such as sodium styrenesulfonate, potassium styrenesulfonate and calcium styrenesulfonate; (meth)acrylic acid-ethyl-2-sulfonic acid; and (meth)acrylic acid ethyl 2-sulfonic acid salts, such as (meth)acrylic acid ethyl 2-sulfonic acid sodium salt, (meth)acrylic acid ethyl 2-sulfonic acid potassium salt and (meth)acrylic acid ethyl 2-sulfonic acid calcium salt. Of these, sodium styrenesulfonate and (meth)acrylic acid ethyl 2-sulfonic acid sodium salt are preferable because copolymerization with other copolymerizable monomers is readily carried out and washing after preparation of the conductive polymer is readily made.

The monomer (a-2) having chelating ability is a monomer containing a group having chelating ability (group which can coordinate to an ion, e.g., group which can coordinate to an ion derived from an ionic compound when the finally obtained doped π-conjugated polymer (β) is blended with a solvent together with the ionic compound). More specifically, as the ion (cationic species) derived from an ionic compound, lithium ion or ammonium ion (imidazolium ion or the like) is preferably used, as described later, and the group having chelating ability can coordinate to the cationic species in the solution. By virtue of this, in the solution containing the doped π-conjugated polymer (β) and the ionic compound, precipitation due to aggregation of the π-conjugated polymer (β) can be inhibited. The monomer (a-2) may be used singly or as a mixture of two or more kinds.

The monomer (a-2) preferably has a group having chelating ability and a polymerizable vinyl group. The group having chelating ability is preferably, for example, a pyridyl group or a phenanthroline structure, or a group represented by the following formula (IV) or a group represented by the following formula (V). An oxygen atom contained in the group represented by the following formula (IV) or the group represented by the following formula (V) can readily coordinate to an ion (cationic species) derived from an ionic compound.

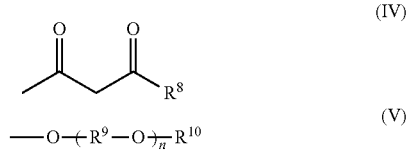

(IV)

$$—O—(R^9—O)_n—R^{10}$$

(V)

In the formula (IV), $R^8$ is an alkyl group of 1 to 4 carbon atoms. Examples of the alkyl groups include methyl group, ethyl group, propyl group and butyl group. Of these, methyl group is more preferable from the viewpoint of impartation of water solubility as an emulsifying agent.

In the formula (V), $R^9$ is an ethylene group. $R^{10}$ is an alkyl group of 1 to 4 carbon atoms. Examples of the alkyl groups include methyl group, ethyl group, propyl group and butyl group. Of these, methyl group is more preferable from the viewpoint of impartation of water solubility as an emulsifying agent. n is an integer of 1 to 5.

Specific examples of such monomers (a-2) include 2-acetoacetoxyethyl(meth)acrylate, methoxyethyl(meth)acrylate, ethoxyethyl(meth)acrylate, butoxyethyl(meth)acrylate, methoxypolyethylene glycol(meth)acrylate, ethyl carbitol (meth)acrylate, methoxydiethylene glycol methacrylate, methoxytriethylene glycol(meth)acrylate, vinylpyridine and vinylphenanthroline.

The other monomer (a-3) is a monomer other than the monomer (a-1) and the monomer (a-2). As the other monomer (a-3), a monomer (a-3-1) having a hydrophilic group and a polymerizable vinyl group, a monomer (a-3-2) having an aromatic group or an alicyclic group and a polymerizable vinyl group, or a monomer (a-3-3) having an alkyl group and a polymerizable vinyl group is preferably used. The monomer having a hydrophilic group and a polymerizable vinyl group has pH, as measured when the monomer is dissolved in distilled water having pH of 7.0 in a ratio of 0.1 mmol/l at room temperature, of more than 5.5 but less than 8.0 (5.5<pH<8.0). The monomer (a-3) may be used singly or as a mixture of two or more kinds.

Of these monomers (a-3-1) to (a-3-3), a (meth)acrylic monomer is more preferably used.

Examples of the monomers (a-3-1) which are (meth)acrylic monomers include acrylic acid, methacrylic acid, 2-methacryloyloxyethylsuccinic acid, 2-hydroxyethyl(meth) acrylate, 2-hydroxypropyl(meth)acrylate, 4-hydroxybutyl (meth)acrylate and β-(meth)acryloyloxyethyl hydrogensuccinate.

Examples of the monomers (a-3-2) which are (meth)acrylic monomers include benzyl(meth)acrylate, phenoxyethyl(meth)acrylate, (meth)acrylic acid ethyl 2-phthalic acid methyl ester, (meth)acrylic acid ethyl 2-phthalic acid ethyl ester, cyclohexyl(meth)acrylate, dicyclopentanyl(meth)acrylate, dicyclopentanyloxyethyl(meth)acrylate, dicyclopentenyl (meth)acrylate, dicyclopentenyloxyethyl(meth)acrylate, isobornyl(meth)acrylate, t-butylcyclohexyl(meth)acrylate, cyclohexyl(meth)acrylate, (meth)acrylate morpholine, pentamethylpiperidinyl methacrylate, tetramethylpiperidinyl methacrylate, 1-adamantyl(meth)acrylate, 2-methyl-2-adamantyl(meth)acrylate, 2-ethyl-2-adamantyl(meth)acrylate, 3-hydroxy-1-adamantyl(meth)acrylate and naphthalene (meth)acrylate.

Examples of the monomers (a-3-3) which are (meth) acrylic monomers include methyl(meth)acrylate, ethyl(meth) acrylate, n-propyl(meth)acrylate, i-propyl(meth)acrylate, n-butyl(meth)acrylate, i-butyl(meth)acrylate, i-propyl(meth) acrylate, n-pentyl(meth)acrylate, i-pentyl(meth)acrylate, t-butyl(meth)acrylate, 2-ethylhexyl(meth)acrylate, isooctyl (meth)acrylate, lauryl(meth)acrylate and stearyl(meth)acrylate.

The monomer (a-3-1) which is a monomer other than the (meth)acrylic monomers and has a hydrophilic group and a polymerizable vinyl group is, for example, maleic acid (anhydride). Examples of the monomers (a-3-2) which are monomers other than the (meth)acrylic monomers and have an aromatic group or an alicycic group and a polymerizable vinyl group include styrene, dimethylstyrene, vinylnaphthalene, n-vinylcarbazole, vinyl-n-ethylcarbazole and vinylfluorene.

The polymer compound (A) for use in the present invention is obtained by polymerizing the monomer (a-1) in an amount of 10 to 50% by mol, more preferably 10 to 40% by mol, still more preferably 15 to 35% by mol, the, monomer (a-2) in an amount of 10 to 90% by mol, more preferably 10 to 80% by mol, still more preferably 15 to 70% by mol, and the monomer (a-3) in an amount of 0 to 70% by mol, more preferably 0 to 70% by mol, still more preferably 15 to 70% by mol. The total amount of the monomers (a-1) to (a-3) is 100% by mol. When two or more kinds of the monomers (a-1) are used, the amount of the monomer (a-1) means the total amount of the two or more kinds of the monomers. The same shall apply to the monomer (a-2) and the monomer (a-3). When the hydrophilic monomer (a-1) and if necessary the other monomer (a-3) are polymerized in the above amounts, a balance between hydrophobicity and hydrophilicity can be controlled. Consequently, this further contributes to the enhancement of solubility of the finally obtained doped π-conjugated polymer (β). Moreover, when the monomer (a-2) is polymerized in the above amount, aggregation of the finally obtained doped π-conjugated polymer (β) can be inhibited even if the doped π-conjugated polymer (β) is blended with a solvent together with an ionic compound. That is to say, a solution having high stability can be prepared.

The polymerization reaction of the monomers (a-1) to (a-3) can be carried out by a publicly known process. For example, the polymer compound (A) can be prepared by mixing these monomers, then adding a polymerization initiator and initiating polymerization by heating, light irradiation or the like.

The polymerization process to prepare the polymer compound (A) is not specifically restricted as far as the process can be performed in such a manner that a certain specific monomer is not separated from the monomer mixture. For example, solution polymerization, bulk polymerization or precipitation polymerization can be used.

The polymerization initiator used for the polymerization reaction is not specifically restricted as far as it is soluble in the above components and a solvent used in the reaction. Examples of such polymerization initiators include oil-soluble peroxide-based thermal polymerization initiators, such as benzoyl peroxide (BPO), oil-soluble azo-based thermal polymerization initiators, such as azobisisobutyronitrile (AIBN), and water-soluble azo-based thermal polymerization initiators, such as azobiscyanovaleric acid (ACVA). When the proportion of water in the solvent is high in the solution polymerization, water-soluble peroxide-based thermal polymerization initiators, such as ammonium persulfate and potassium persulfate, and aqueous hydrogen peroxide may be used. It is also possible to use a combination with a redox agent such as ferrocene or an amine.

The polymerization initiator can be used in an amount of, for example, 0.001 to 0.1 mol based on 1 mol of the total amount of the monomers, and the polymerization initiator can be introduced at a time, dropwise or successively. In the case of the bulk polymerization or the solution polymerization using a small amount (not more than 50% by weight based on the total amount of the monomers) of a solvent, polymerization using a combination of mercaptan and metallocene (see, for example, Japanese Patent Laid-Open Publication No. 344823/2000) is also possible.

Examples of the solvents used in the polymerization reaction include alcohol-based solvents, such as methanol, ethanol, isopropyl alcohol and butanol; ketone-based solvents, such as acetone, methyl ethyl ketone and methyl isobutyl ketone; glycol-based solvents, such as methyl cellosolve, ethyl cellosolve, propylene glycol methyl ether and propylene glycol ethyl ether; and ester-based solvents, such as ethyl acetate, methyl lactate and ethyl lactate.

In the polymerization, a chain transfer agent may be used in addition to the polymerization initiator. The chain transfer agent is appropriately used for the purpose of controlling the molecular weight. The chain transfer agent employable herein is not specifically restricted provided that it can be dissolved in the above monomers and the solvent. Examples of such chain transfer agents include alkylthiols, such as dodecyl mercaptan and heptyl mercaptan; water-soluble thiols having a polar group, such as mercaptopropionic acid (BMPA); and oily radical inhibitors, such as α-styrene dimer (ASD).

The polymerization reaction is preferably carried out at a temperature of not higher than the boiling point of the solvent used (except the case of bulk polymerization), and for example, the reaction is carried out at a temperature of about 65° C. to 80° C. However, in the case of the bulk polymerization or the polymerization using a combination of mercaptan and metallocene (see, for example, Japanese Patent Laid-Open Publication No. 344823/2000), the reaction is preferably carried out at a temperature of 25° C. to 80° C.

The polymerization product obtained as above is purified, if necessary, whereby the polymer compound (A) can be obtained. In this purification, low-molecular impurities, such as oily low-molecular impurities and residual monomers, are removed by the use of an oily poor solvent, such as hexane, and thereafter, the polymer is precipitated with an aqueous poor solvent, such as acetonitrile or methanol, to remove aqueous impurities and residues.

Preferred reasons for the purification are as follows. That is to say, the polymer compound (A) is introduced as a dopant into the π-conjugated polymer (β) and it acts as a stack inhibitor and as a solvent solubilizing agent. However, if a polymerization initiator residue, a monomer, an oligomer, a heterogeneous composition, etc. remain, the function of the finally obtained doped π-conjugated polymer (β) is sometimes lowered. By virtue of such purification, a homogeneous doped π-conjugated polymer (β) is obtained without including a heterogeneous radical polymerization product, and besides, a dissolved state in a solvent can be exhibited.

The polymer compound (A) obtained as above preferably has a weight-average molecular weight, as measured by GPC, of 3,000 to 100,000. If the weight-average molecular weight is less than 3,000, the function of the polymer compound is sometimes insufficient. On the other hand, if the weight-average molecular weight exceeds 100,000, solubility of the polymer compound in the polymerization field (acidic aqueous solution) is sometimes insufficient in the preparation of the π-conjugated polymer (β). Moreover, since the solubility of the polymer compound itself in a solvent is poor, the dopedπ-conjugated polymer (β) is hardly dissolved in the solvent in some cases.

The doped π-conjugated polymer (β) of the present invention is prepared in the following manner using the polymer compound (A). That is to say, the doped π-conjugated polymer (β) is prepared by dissolving the polymer compound (A) in an electrolytic solvent, then adding at least one monomer selected from monomers represented by the following formulas (I) to (III) to the solution and oxidizing it with an oxidizing agent. Thus, the π-conjugated polymer (β) is formed and is simultaneously doped with the polymer compound (A). The polymer compound (A) may be used singly or as a mixture of two or more kinds. In the present specification, the "monomers represented by the formulas (I) to (III)" are also referred to as "monomers (I) to (III)", respectively.

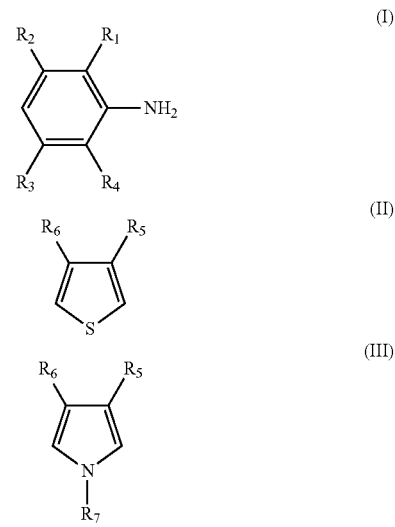

In the formula (I), $R_1$ to $R_4$ are each independently a hydrogen atom, an alkyl group of 1 to 12 carbon atoms or an alkoxy group of 1 to 10 carbon atoms. Examples of the alkyl groups include methyl group, ethyl group, propyl group and butyl group. From the viewpoint of solvent solubility, a longer alkyl group can give better solubility in a hydrophobic solvent, but from the viewpoint of conductivity of the conductive polymer, a hydrogen atom is preferable. Examples of the alkoxy groups include methoxy group, ethoxy group, propoxy group and butoxy group. Although a longer alkoxy group among them gives better solubility in a polar solvent, a hydrogen atom is preferable for the same reason as above.

The monomer represented by the formula (I) is specifically a monomer (I-1) wherein at least one of $R_1$ to $R_4$ is an alkoxy group of 1 to 10 carbon atoms, and $R_1$ to $R_4$ other than the alkoxy group are each a hydrogen atom or an alkyl group of 1 to 10 carbon atoms, or a monomer (I-2) wherein $R_1$ to $R_4$ are each a hydrogen atom or an alkyl group of 1 to 12 carbon atoms.

More specific examples of the monomers (I-1) include o-anisidine, p-anisidine, m-anisidine, methoxyaniline and butoxyaniline. More specific examples of the monomers (I-2) include aniline, o-toluidine, m-toluidine, 3,5-dimethylaniline, 2,3-dimethylaniline, 2,5-dimethylaniline, 2,6-dimethylaniline, 2-ethylaniline, 3-ethylaniline, 2-isopropylaniline, 3-isopropylaniline, 2-methyl-6-ethylaniline, 2-n- propylaniline, 2-methyl-5-isopropylaniline, 2-butylaniline, 3-butylaniline, 5,6,7,8-tetrahydro-1-naphthylamine and 2,6-diethylaniline.

In the formula (II), $R_5$ to $R_6$ are each independently a hydrogen atom, an alkyl group of 1 to 12 carbon atoms or an alkoxy group of 1 to 10 carbon atoms. Examples of the alkyl groups and the alkoxy groups, preferred ranges thereof and the reasons are the same as those described for $R_1$ in the formula (I). $R_5$ and $R_6$ may be bonded to each other to form an alkylenedioxy group of 1 to 8 carbon atoms. Examples of the alkylenedioxy groups include ethylenedioxy group and propylenedioxy group. Of these, ethylenedioxy group is preferable.

The monomer represented by the formula (II) is specifically a monomer (II-1) wherein at least one of $R_5$ to $R_6$ is an alkoxy group of 1 to 10 carbon atoms, $R_5$ to $R_6$ other than the alkoxy group are each a hydrogen atom or an alkyl group of 1 to 10 carbon atoms, and $R_5$ and $R_6$ may be bonded to each other to form an alkylenedioxy group of 1 to 8 carbon atoms, or a monomer (II-2) wherein $R_5$ to $R_6$ are each a hydrogen atom or an alkyl group of 1 to 12 carbon atoms.

More specific examples of the monomers (II-1) include 3-methoxythiophene, 3,4-ethylenedioxythiophene, 3,4-propylenedioxythiophene, 3,4-dimethoxythiophene, 3,4-(2',2'-dimethylpropylene)dioxythiophene and 3,4-(2',2'-diethylpropylene)dioxythiophene. More specific examples of the monomers (II-2) include thiophene, 3-methylthiophene, 3-ethylthiophene, 3-propylthiophene, 3-butylthiophene, 3-pentylthiophene, 3-hexylthiophene, 3-heptylthiophene and 3-n-octylthiophene.

In the formula (III), $R_5$ to $R_6$ are each independently a hydrogen atom, an alkyl group of 1 to 12 carbon atoms or an alkoxy group of 1 to 10 carbon atoms. Examples of the alkyl groups and the alkoxy groups, preferred ranges thereof and the reasons are the same as those described for $R_1$ in the formula (I). $R_5$ and $R_6$ may be bonded to each other to form an alkylenedioxy group of 1 to 8 carbon atoms. Examples of the alkylenedioxy groups and preferred ranges thereof are the same as those described for $R_5$ in the formula (II). $R_7$ is a hydrogen atom, an alkyl group of 1 to 12 carbon atoms or an aromatic group. Examples of the alkyl groups include methyl group, ethyl group, propyl group and butyl group. Of these, a hydrogen atom is preferable.

The monomer represented by the formula (III) is specifically a monomer (III-1) wherein at least one of $R_5$ to $R_6$ is an alkoxy group of 1 to 10 carbon atoms, $R_5$ to $R_6$ other than the alkoxy group are each a hydrogen atom or an alkyl group of 1 to 10 carbon atoms, $R_7$ is a hydrogen atom, an alkyl group of 1 to 6 carbon atoms or an aromatic group, and $R_5$ and $R_6$ may be bonded to each other to form an alkylenedioxy group of 1 to 8 carbon atoms, or a monomer (III-2) wherein $R_5$ to $R_6$ are each a hydrogen atom or an alkyl group of 1 to 12 carbon atoms, and $R_7$ is a hydrogen atom or an alkyl group of 1 to 12 carbon atoms.

More specific examples of the monomers (III-1) include 3,4-ethylenedioxypyrrole and 3,4-propylenedioxypyrrole. More specific examples of the monomers (III-2) include pyrrole, 3-methylpyrrole, 3-heptylpyrrole and 3-n-octylpyrrole.

The monomers (I) to (III) may be used by mixing them, or the monomers (I) to (III) may be each used singly or as a mixture of two or more kinds.

For dissolving the doped π-conjugated polymer (β) in a solvent, a combination of the monomers (I) to (III) and the monomers (a-1) to (a-3) for preparing the polymer compound (A) is appropriately selected. For example, when the monomer (I-1), the monomer (II-1) and the monomer (III-1) are used, it is preferable to use the monomer (a-3-1) in the preparation of the polymer compound (A). In this case, the doped π-conjugated polymer (β) is readily dissolved in alcohol-based solvents, such as methanol, ethanol and propylene glycol monomethyl ether, and ketone-based solvents, such as acetone, methyl ethyl ketone and cyclopentanone. When the monomer (I-2), the monomer (II-2) and the monomer (III-2) are used, it is preferable to use the monomer (a-3-2) or the monomer (a-3-3) in the preparation of the polymer compound (A). In this case, the doped π-conjugated polymer (β) is readily dissolved in hydrophobic solvents, such as toluene and ethyl acetate.

In the preparation of the π-conjugated polymer (β) doped with the polymer compound (A), for example, the electrolytic solvent such as ion-exchanged water is acidified first, when needed, and to this, the polymer compound (A) is added. Subsequently, to the mixture, the monomers (I) to (III) are added, and an oxidizing agent is further added to perform oxidation polymerization. Depending upon the solubility of the polymer compound (A) in the ion-exchanged water, an organic solvent having high hydrophilicity may be used in combination. Examples of the organic solvents having high hydrophilicity include ketone-based solvents, such as acetone and methyl ethyl ketone, and alcohol-based solvents, such as methanol, ethanol and isopropyl alcohol.

The above preparation process has advantages that: (1) an anionic field where the oxidation proceeds can be uniformly and stably provided, (2) the monomers can be stably provided while controlling stacking of the π-conjugated polymer in the polymerization growing field, (3) doping of the π-conjugated polymer with the polymer compound (A) in the polymerization growing field is accelerated, and (4) the doped π-conjugated polymer can be precipitated from the electrolytic solvent.

Examples of acidic components used for acidifying the electrolytic solvent in the above reaction include hydrochloric acid, sulfuric acid, perchloric acid, periodic acid, iron(III) chloride and iron(III) sulfate. The amount of the acidic component is in the range of about 0.5 to 4.0 mol based on 1 mol of the total amount of the monomers (I) to (III) used.

The oxidizing agent used for the reaction needs to be appropriately selected according to the redox potential of the aromatic compound (monomer) for forming the π-conjugated polymer (β), but examples of the oxidizing agents include ammonium peroxodisulfate, potassium peroxodisulfate, sodium peroxodisulfate, iron(III) chloride, iron(III) sulfate, iron(III) tetrafluoroborate, iron(III) hexafluorophosphate, copper(II) sulfate, copper(II) chloride, copper(II) tetrafluoroborate and copper(II) hexafluorophosphate.

The ratio between the amount of the polymer compound (A) and the amount of the used monomers (I) to (III) in the reaction depends upon the desired properties of the doped π-conjugated polymer, but for example, when the polymer compound (A) has a sulfonic acid group, the ratio between them can be given as follows using the number of moles of the sulfonic acid group in the polymer compound (A) and the total number of moles of the monomers (I) to (III) used. That is to say, the polymer compound (A) is allowed to exist so that the amount of the sulfonic acid group in the compound may become 0.3 to 1.5 mol based on 1 mol of the total amount of the monomers (I) to (III). When the polymer compound (A) has a sulfonate group, the "sulfonic acid group" is replaced with "sulfonate group" in the above description. When the polymer compound (A) has a sulfonic acid group and a sulfonate group, the "sulfonic acid group" is replaced with "sulfonic acid group and sulfonate group" in the above description. Further, the polymer compound (A) may be allowed to exist in an amount of 10 to 200 parts by weight based on 100 parts by weight of the total amount of the monomers (I) to (III).

The oxidizing agent is usually used in an amount of about 1.0 to 3.0 mol (in terms of monovalent oxidizing agent) based on 1 mol of the total amount of the monomers (I) to (III). However, even if the amount of the oxidizing agent is not more than 1 mol based on 1 mol of the total amount of the monomers (I) to (III), polymerization can be sufficiently carried out depending upon the degree of oxidation (degree of acidity) in the system.

The temperature of the polymerization reaction for obtaining the doped π-conjugated polymer is appropriately determined according to the types of the monomers (I) to (III) because the heating value after the oxidation reaction and ease of abstraction of hydrogen vary depending upon the types of the monomers (I) to (III). In general, when the monomer (I) is used, the temperature of the polymerization reaction is preferably not higher than 40° C., and when the monomer (II) is used, the temperature is preferably not higher than 90° C., and when the monomer (III) is used, the temperature is preferably not higher than 20° C.

When the molecular weight of the doped π-conjugated polymer (β) is intended to be increased, the reaction temperature is made relatively lower and the reaction time is made relatively longer. When the molecular weight thereof is decreased, they are reversed.

The polymerization product obtained as above is subjected to washing, if necessary, whereby the doped π-conjugated polymer (β) that is a desired product can be obtained.

In the composition obtained by doping the π-conjugated polymer (β) with the polymer compound (A) as above, all the molecules of the π-conjugated polymer (β) are doped with the polymer compound (A) in some cases, but all the molecules of the π-conjugated polymer (β) are not doped with the polymer compound (A) in some cases. That is to say, the π-conjugated polymer (β) doped with the polymer compound (A) and the π-conjugated polymer (β) that is not doped with the polymer compound (A) may exist together.

In the π-conjugated polymer (β) doped with the polymer compound (A), the number-average molecular weight of the π-conjugated polymer (β) is usually in the range of 1,000 to 300,000. By the way, since doped conducive polymers are usually improved in flatness, they undergo stacking (crystallization) and become insoluble in solvents. The above number-average molecular weight is a value as measured by GPC using a solvent in which the π-conjugated polymer skeleton becomes soluble after the dope component is eliminated, and is a reference value including decomposition of the π-conjugated polymer at the time of dedoping step (alkali treatment, electrical decomposition, etc.).

When such a doped π-conjugated polymer (β) is blended with a solvent, the doped π-conjugated polymer (β) is homogeneously dissolved in the solvent to obtain a solution of the doped π-conjugated polymer (β). This is attributed to lowering of stacking and lowering of crystallizability of the resulting π-conjugated polymer (β) caused by the steric hindrance of the polymer compound (A), as previously described. Moreover, since the polymer compound (A) is a compound obtained by polymerizing the monomer (a-1) and if necessary the monomer (a-3), the property concerning hydrophobicity or hydrophilicity has been already controlled. This also contributes to excellent solubility of the doped π-conjugated polymer (β).

Examples of the solvents for preparing the solution include aromatic solvents, such as benzene, toluene and xylene; ester-based solvents, such as ethyl acetate, propyl acetate, butyl acetate, methyl lactate and ethyl lactate; ketone-based solvents, such as acetone, methyl ethyl ketone, methyl isobutyl ketone, cyclohexanone and cyclopentanone; and alcohol-based solvents, such as methanol, ethanol, isopropyl alcohol, methyl cellosolve and propylene glycol monomethyl ether acetate. The above solvents may be used singly or as a mixture of two or more kinds.

The π-conjugated polymer (β) doped with the polymer compound (A) is preferably dissolved in an amount of about 0.1 to 10% by mass in 100% by mass of the solution.

For the purposes of improving stability of the solution and enhancing electrical conductivity of a coating film formed from the solution, aromatic compounds having a hydroxyl group, such as benzyl alcohol, phenol, m-cresol, o-cresol, 2-naphthanol, 1-naphthanol, guaiacol and 2,6-dimethylphenol, may be added to the solution.

Such a compound is preferably added in an amount of about 50 to 500 parts by weight based on 100 parts by weight of the solution (total amount of the doped π-conjugated polymer (β) and the solvent).

To the solution, other compounds may be further added.

Other compounds are preferably added in an amount of about 0.1 to 500 parts by weight based on 100 parts by weight of the solution (total amount of the doped π-conjugated polymer (β) and the solvent).

The solution of the doped π-conjugated polymer (β) is preferably used for forming a conductive film. More specifically, the solution is applied to an area that needs to be imparted with electrical conductivity, and the solvent is volatilized to dryness, whereby a conductive film can be simply formed. In the solution, the doped π-conjugated polymer (β) is homogeneously dissolved, so that a smooth film can be formed, and the film has high electrical conductivity.

The solution of the doped π-conjugated polymer (β) is preferably used also for forming an electrolyte polymer layer of a dye-sensitized solar cell. In this case, an ionic compound is usually further added to the above solution.

Examples of the ionic compounds include lithium halide, lithium salt of Lewis acid and ammonium salt of Lewis acid. More specifically, LiI, NaI, KI, $LiBF_4$, $LiPF_6$, $AlI_3$, $FeI_3$, $NiI_2$, CuI, $CoI_2$, 1-methyl-3-propylimidazolium iodide and 1,2-dimethyl-3-propylimidazolium iodide are preferably used as the ionic compounds. As the cationic species, lithium having a low molecular weight and having high mobility is particularly preferable. On the other hand, an ammonium salt of Lewis acid is also preferably used because it is sometimes superior to the lithium salt compounds in solubility.

The ionic compound is preferably added in an amount of about 0.1 to 500 parts by weight based on 100 parts by weight of the solution (total amount of the doped π-conjugated polymer (β) and the solvent).

The polymer compound (A) is a compound obtained by polymerizing the monomer (a-2), as previously described, and hence, even if the finally obtained doped π-conjugated polymer (β) is blended with the solvent together with the ionic compound, aggregation of the π-conjugated polymer (β) can be inhibited. Thus, by the use of the finally obtained doped π-conjugated polymer (β), a solution having high stability can be formed. When the ionic compound is blended, the doped π-conjugated polymer (β) is homogeneously dissolved, but it is sometimes homogeneously microdispersed in the solvent. However, even if the doped π-conjugated polymer (β) is microdispersed, there is no problem in the preparation of the later-described electrolyte polymer layer.

When the solution is applied onto an area where an electrolyte polymer layer is intended to be formed (e.g., on a metal oxide layer having a dye supported thereon) and the solvent is volatilized to dryness, an electrolyte polymer layer can be simply formed. In the solution, the doped π-conjugated polymer (β) is homogeneously dissolved or homogeneously microdispersed, so that a smooth electrolyte polymer layer can be formed, and the electrolyte polymer layer has high electrical conductivity.

The Lewis acid or the halogen anion can be doped on the π-conjugated polymer (β), and lithium or ammonium of a cationic species that is a counter ion of the Lewis acid or the halogen anion can become a counter ion of an anionic dopant ionic species (dopant ionic species derived from the polymer compound (A)) having been dedoped from the π-conjugated polymer (β). On this account, during the course of generation of electromotive force by the dye-sensitized solar cell, the dopant ionic species and the Lewis acid or the halogen anion of the ionic compound (B) are replaced with each other in the electrolyte polymer layer to transfer charge.

Next, the composition in which a polymer compound (A) and a π-conjugated polymer (β) are contained but the polymer compound (A) is not incorporated into the π-conjugated polymer (β) is described. In this case, the composition can be prepared by preparing each of the polymer compound (A) and the π-conjugated polymer (β) through polymerization in advance and mixing them.

The polymer compound (A) is the same as that described for the doped π-conjugated polymer (β). The π-conjugated polymer (β) is obtained by polymerizing at least one monomer selected from monomers represented by the following formulas (I) to (III) in an electrolytic solvent in the presence of an oxidizing agent. This is the same as that described for the doped π-conjugated polymer (β), except that the polymerization is not carried out in the presence of the polymer compound (A).

The polymer compound (A) is contained in an amount of 10 to 200 parts by weight based on 100 parts by weight of the π-conjugated polymer (β).

Preparation of a solution obtained from the composition containing the polymer compound (A) and the π-conjugated polymer (β) and formation of a film are also the same as those described for the doped π-conjugated polymer (β).

EXAMPLES

The conductive polymer composition of the present invention is further described with reference to the following examples, but it should be construed that the present invention is in no way limited to those examples.

In the following examples, the molecular weight and the surface resistance value were measured by the following methods.

Molecular Weight

The molecular weight was measured by GPC under the following conditions.

Name of apparatus: HLC-8120 (manufactured by Tosoh Corporation)

Column: GF-1G7B+GF-510HQ (Asahipak: registered trademark, manufactured by Showa Denko K.K.)

Reference substance: polystyrene and sodium polystyrenesulfonate

Sample concentration: 1.0 mg/ml

Eluting solution: 50 mmol lithium chloride aqueous solution/CH3CN=60/40 wt

Flow rate: 0.6 ml/min

Column temperature: 30° C.

Detector: UV 254 nm

Surface Resistance

The surface resistance was measured by a four-terminal four-prove method using a low resistivity meter Rolesta GP and PSP type probes manufactured by Dia Instruments Co., Ltd.

Preparation Example 1

In a four-neck flask having a volume of 1000 cm$^3$ and equipped with a stirrer, a nitrogen gas feed pipe, a reflux condenser, an inlet and a thermometer, 24.3 g (25% by mol) of 2-sodium sulfoethyl methacrylate (MS-2N), 25.7 g (15% by mol) of acetoacetoxyethyl methacrylate (AAEM), 42.8 g (30% by mol) of benzylmethacrylate (BzMA), 48.2 g (30% by mol) of 2-ethylhexyl methacrylate (2EHMA), 50 g of ion-exchanged water and 300 g of isopropyl alcohol (IPA) were introduced. While introducing nitrogen gas into the flask, the mixture in the flask was heated up to 70° C. Subsequently, 0.7 g of azobisisobutyronitrile was introduced into the flask, and while maintaining the temperature at 70° C., polymerization reaction was carried out for 18 hours to obtain a polymer solution (A-1) containing a polymer compound (A).

The whole amount of the resulting polymer solution (A-1) was transferred into a beaker of 2000 cm$^3$, and 500 g of hexane was added while stirring with a stirrer. Thereafter, the mixture was allowed to stand still for 1 hour, and an oily layer containing impurities was removed. The solution on the aqueous layer side was dried with a dryer at 100° C. for 24 hours. The resulting solid was dried at 100° C. for 24 hours under reduced pressure and then crushed with a mortar to obtain a powder (AP-1) of a polymer compound.

A weight-average molecular weight (Mw) of the resulting polymer compound (AP-1) was measured by a gel permeation chromatograph (GPC), and as a result, it was 61,000.

Preparation Examples 2 to 11

Polymer compounds (AP-2) to (AP-11) were obtained in the same manner as in Preparation Example 1-1, except that the monomers were replaced with monomers shown in Table 1-1. Weight-average molecular weights (Mw) of the polymer compounds (AP-2) to (AP-11) are shown in Table 1-1. In Table 1-1, the monomers of Preparation Example 1-1 are also shown.

TABLE 1-1

|  | Polymer compound (A) | Monomer (a-1) (mol %) | Monomer (a-2) (mol %) | Monomer (a-3) (mol %) | Mw |
|---|---|---|---|---|---|
| Prep. Ex. 1 | AP-1 | MS-2N = 25 | AAEM = 15 | BzMA/2EHMA = 30/30 | 61,000 |
| Prep. Ex. 2 | AP-2 | MS-2N = 25 | AAEM = 70 | BzMA = 5 | 58,000 |
| Prep. Ex. 3 | AP-3 | NaSS = 25 | AAEM = 30 | HEMA = 45 | 34,000 |
| Prep. Ex. 4 | AP-4 | MS-2N = 25 | PME-100 = 75 | — | 71,000 |
| Prep. Ex. 5 | AP-5 | MS-2N = 20 | AAEM/PME-100 = 15/35 | BzMA = 30 | 64,000 |

TABLE 1-1-continued

| | Polymer compound (A) | Monomer (a-1) (mol %) | Monomer (a-2) (mol %) | Monomer (a-3) (mol %) | Mw |
|---|---|---|---|---|---|
| Prep. Ex. 6 | AP-6 | NaSS = 40 | AAEM = 10 | BzMA/2EHMA = 25/25 | 31,000 |
| Prep. Ex. 7 | AP-7 | NaSS = 5 | AAEM = 20 | CHMA = 75 | 46,000 |
| Prep. Ex. 8 | AP-8 | NaSS = 60 | PME-100 = 10 | 2-EHMA = 30 | 32,000 |
| Prep. Ex. 9 | AP-9 | MS-2N = 30 | AAEM = 5 | BzMA/2EHMA = 30/35 | 63,000 |
| Prep. Ex. 10 | AP-10 | MS-2N = 85 | AAEM = 5 | CHMA = 10 | 69,000 |
| Prep. Ex. 11 | AP-11 | MS-2N = 20 | — | BzMA = 80 | 49,000 |

Meanings of the symbols in Table 1-1 are as follows.
MS-2N: 2-sodium sulfoethyl methacrylate
NaSS: sodium styrenesulfonate
AAEM: acetoacetoxyethyl methacrylate
PME-100: methoxydiethylene glycol methacrylate
BzMA: benzyl methacrylate
2EHMA: 2-ethylhexyl methacrylate
CHMA: cyclohexyl methacrylate
HEMA: 2-hydroxyethyl methacrylate Example 1

In a four-neck flask having a volume of 1000 cm$^3$ and equipped with a stirrer, a nitrogen gas feed pipe, a reflux condenser, an inlet and a thermometer, 27.8 g of the polymer compound (AP-1) obtained in Preparation Example 1, 500 g of ion-exchanged water and 6 g of a 35% hydrochloric acid aqueous solution were introduced, and the mixture was heated to 60° C., stirred for 3 hours and then cooled down to 25° C. The solution in the flask was homogeneous and transparent.

Subsequently, to the solution in the flask, 4.65 g of aniline was added, and they were stirred to give a homogeneous emulsion, followed by cooling the emulsion down to 0° C. Then, 10 g of ammonium peroxodisulfate was dropped into the flask over a period of 2 hours, and polymerization reaction was continued for 48 hours while maintaining the temperature at 0° C.

After completion of the polymerization reaction, the whole amount of the reaction solution was subjected to vacuum filtration, then the residue was transferred into a beaker of 500 cm$^3$, and 100 g of methanol and 100 g of ion-exchanged water were introduced. The mixture was stirred for 30 minutes with a stirrer and then subjected to vacuum filtration. The residue was dried at 20° C. for 24 hours under reduced pressure to obtain a conductive polymer composition (E-1).

Examples 2 to 12, Comparative Examples 1 to 5

Conductive polymer compositions (E-2) to (E-12) and (EC-1) to (EC-5) were prepared in the same manner as in Example 1, except that the conditions were changed to those shown in Table 1-3. In Table 1-3, the monomer components and the monomer ratios of the compositions, the types and the amounts of the polymer compounds (A) used, the amount of hydrochloric acid used, the oxidizing agent used and the amount thereof, and the reaction conditions (reaction temperature and reaction time) are shown including those of Example 1.

TABLE 1-3

| | Conductive polymer composition | Main skeleton and amount | | | | Type and amount of emulsifying agent | Amount of 35% hydrochloric acid | Type and amount of oxidizing agent | Reaction temperature | Reaction time |
|---|---|---|---|---|---|---|---|---|---|---|
| | | Aniline | Pyrrole | PEDOT | Anisidine | | | | | |
| Ex. 1 | (E-1) | 4.65 g | | | | AP-1 27.8 g | 6 g | APS 10 g | 0° C. | 48 hours |
| Ex. 2 | (E-2) | | 3.35 g | | | AP-1 15.9 g | 6 g | APS 10 g | −5° C. | 48 hours |
| Ex. 3 | (E-3) | | | | 6.16 g | AP-1 27.8 g | 6 g | APS 10 g | 0° C. | 52 hours |
| Ex. 4 | (E-4) | | | 4.2 g | | AP-2 17 g | 6 g | FeCl$_3$ 16.5 g | 80° C. | 60 hours |
| Ex. 5 | (E-5) | | 3.35 g | | | AP-2 17 g | 6 g | FeCl$_3$ 16.5 g | −5° C. | 48 hours |
| Ex. 6 | (E-6) | | | | 6.16 g | AP-2 29.8 g | 6 g | APS 10 g | 0° C. | 50 hours |
| Ex. 7 | (E-7) | | | 4.2 g | | AP-3 13.9 g | 6 g | FeCl$_3$ 16.5 g | 80° C. | 48 hours |
| Ex. 8 | (E-8) | | | 4.2 g | | AP-4 15.6 g | 6 g | FeCl$_3$ 16.5 g | 80° C. | 48 hours |
| Ex. 9 | (E-9) | | 3.35 g | | | AP-4 15.6 g | 6 g | FeCl$_3$ 16.5 g | −5° C. | 50 hours |
| Ex. 10 | (E-10) | | | | 6.16 g | AP-4 27.3 g | 6 g | APS 10 g | 0° C. | 48 hours |
| Ex. 11 | (E-11) | 4.65 g | | | | AP-5 24.7 g | 6 g | APS 10 g | 0° C. | 48 hours |
| Ex. 12 | (E-12) | 4.65 g | | | | AP-6 17.3 g | 6 g | APS 10 g | 0° C. | 48 hours |
| Comp. Ex. 1 | (EC-1) | | | 4.2 g | | AP-7 53.7 g | 6 g | FeCl$_3$ 16.5 g | 80° C. | 50 hours |
| Comp. Ex. 2 | (EC-2) | | 3.35 g | | | AP-8 6.7 g | 6 g | APS 10 g | 0° C. | 50 hours |
| Comp. Ex. 3 | (EC-3) | | | | 6.16 g | AP-9 23 g | 6 g | APS 10 g | 0° C. | 48 hours |
| Comp. Ex. 4 | (EC-4) | | | 4.2 g | | AP-10 4.8 g | 6 g | FeCl$_3$ 16.5 g | 80° C. | 48 hours |
| Comp. Ex. 5 | (EC-5) | 4.65 g | | | | AP-11 32.2 g | 6 g | APS 10 g | 0° C. | 48 hours |

Meanings of the symbols in Table 1-3 are as follows.
PEDOT: This means a case where 3,4-ethylenedioxythiophene was used as a monomer.
APS: ammonium peroxodisulfate Preparation and Evaluation of Conductive Polymer Solution and Coating Film (1) In a beaker of 200 cm$^3$, 2 g of the conductive polymer composition (E-1) obtained in Example 1 and 38 g of toluene shown in Table 2-1 were introduced, and they were stirred at room temperature to dissolve the composition, whereby a conductive polymer solution was prepared. As for solvents other than toluene, which are shown in Table 2-1, conductive polymer solutions were prepared in the same manner as above.

Further, conductive polymer solutions were prepared in the same manner as above, except that the conductive polymer compositions (E-2) to (E-12) and (EC-1) to (EC-5) obtained in Examples 2 to 12 and Comparative Examples 1 to 5 were each used instead of the conductive polymer composition (E-1) obtained in Example 1.

The results are set forth in Table 2-1. Here, a case where the composition was dissolved and a homogeneous conductive polymer solution was obtained was evaluated as ○, and a case where the composition was not dissolved and a conductive polymer solution was not obtained was evaluated as ×.

Subsequently, the conductive polymer solutions were each applied onto a glass substrate using a doctor blade so that the dry film thickness would become 10 μm, followed by drying. Appearances and surface resistance values of the coating films are set forth in Table 2-2. Here, a case where the coating film was uniform and glossy was evaluated as ◎; a case where the coating film was uniform but not glossy was evaluated as ○; a case where the coating film was ununiform was evaluated as ×; and a case where a film could not be formed was evaluated as ××. The symbol * means a case where crystals were separated and the coating film was hygroscopic. As for conductive polymer solutions using CyPN as a solvent in Examples 1 to 3, 5, 6 and 8 to 12, a conductive polymer solution using PGM as a solvent in Example 4, a conductive polymer solution using methanol as a solvent in Example 7, conductive polymer solutions using methanol as a solvent in Comparative Examples 1, 2 and 4, and conductive polymer solutions using toluene as a solvent in Comparative Examples 3 and 5, preparation and evaluation of a coating film were carried out.

Figure 2:
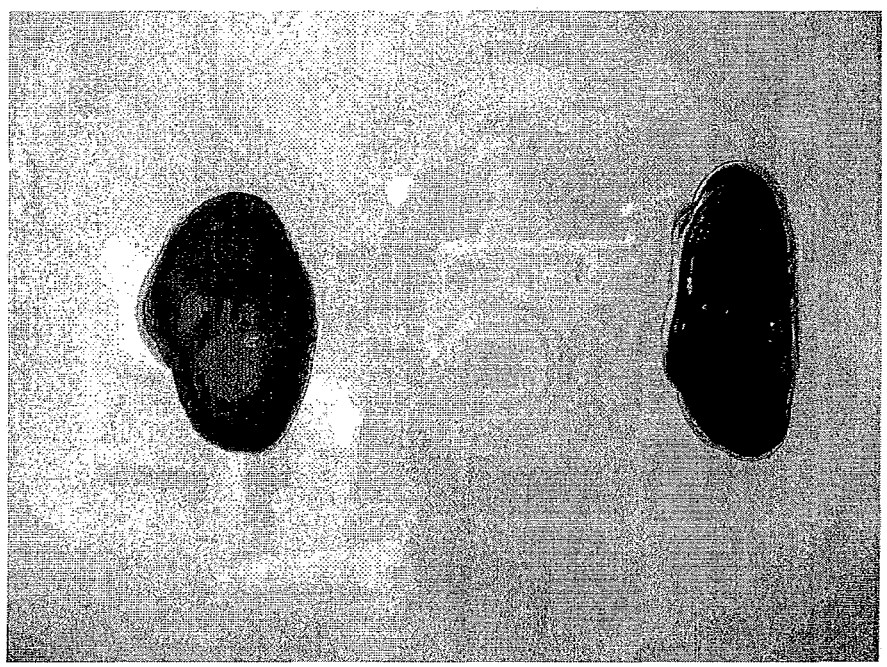
FIG. 2 is a view to explain conductive polymer compositions of an example and a comparative example.

A photograph of FIG. 1 shows a coating film-forming solution obtained from the composition (E-1) of Example 1 (cup on the right-hand side) and a coating film-forming solution obtained from the composition (EC-5) of Comparative Example 1 (cup on the left-hand side). A photograph of FIG. 2 shows a coating film prepared using the composition (E-1) of Example 1 (right-hand side) and a coating film prepared using the composition (EC-5) of Comparative Example 5 (left-hand side).

(2) In a beaker of 200 cm$^3$, 2 g of the conductive polymer composition (E-1) obtained in Example 1 and 40 g of cyclopentanone were introduced, and they were stirred at room temperature to dissolve the composition. Subsequently, 1.2 g of lithium iodide was further introduced, and the mixture was stirred at room temperature to dissolve it, whereby a conductive polymer solution was prepared. Further, conductive polymer solutions were prepared by carrying out stirring and dissolving at room temperature in the same manner as above, except that 1-methyl-3-propylimidazolium iodide and LiBF$_4$ were each used instead of lithium iodide.

Furthermore, conductive polymer solutions were prepared in the same manner as above, except that the conductive polymer compositions (E-2) to (E-12) and (EC-1) to (EC-5) obtained in Examples 2 to 12 and Comparative Examples 1 to 5 were each used instead of the conductive polymer composition (E-1) obtained in Example 1. As a solvent, CyPN was used in Examples 2, 3, 5, 6 and 8 to 12, PGM was used in Example 4, methanol was used in Example 7, methanol was used in Comparative Examples 1, 2 and 4, and toluene was used in Comparative Example 3 and 5. When the conductive polymer composition and the solvent were introduced into a flask and stirred at room temperature, the conductive polymer composition was not dissolved but dispersed in some cases.

The results are set forth in Table 2-1. Here, a case where after the ionic compound was introduced, no aggregation took place and a homogeneous solution state was maintained was evaluated as ◎; a case where after the ionic compound was introduced, aggregation took place a little but a homogeneous microdispersion was formed was evaluated as ○; a case where after the ionic compound was introduced, aggregation took place and a homogeneously dispersed state was not obtained was evaluated as Δ; and a case where after the ionic compound was introduced, marked aggregation took place was evaluated as ×.

Subsequently, the conductive polymer solutions were each applied onto a glass substrate using a doctor blade so that the dry film thickness would become 10 μm, followed by drying. Appearances and surface resistance values of the coating films are set forth in Table 2-2. Here, a case where the coating film was uniform and glossy was evaluated as ◎; a case where the coating film was uniform but not glossy was evaluated as ○; a case where the coating film was ununiform was evaluated as ×; and a case where a film could not be formed was evaluated as ××. The symbol * means a case where crystals were separated and the coating film was hygroscopic.

Figure 3:
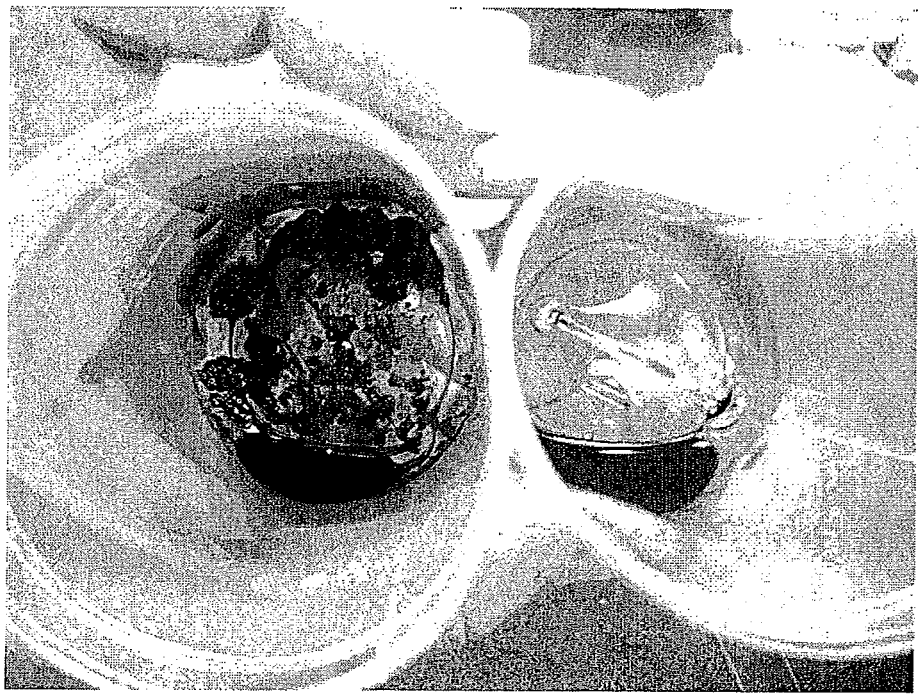
FIG. 3 is a view to explain conductive polymer compositions of an example and a comparative example.
Figure 4:
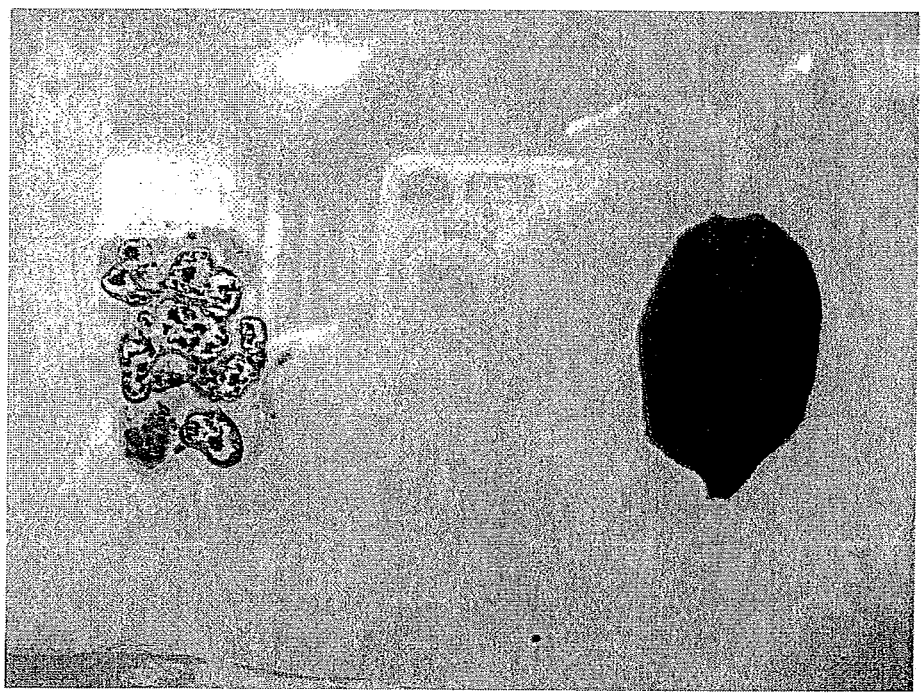
FIG. 4 is a view to explain conductive polymer compositions of an example and a comparative example.

A photograph of FIG. 3 shows a coating film-forming solution obtained from the composition (E-1) of Example 1 (cup on the right-hand side) and a coating film-forming solution obtained from the composition (EC-5) of Comparative Example 1 (cup on the left-hand side), in the case where an ionic compound was introduced. A photograph of FIG. 4 shows a coating film prepared using the composition (E-1) of Example 1 (right-hand side) and a coating film prepared using the composition (EC-5) of Comparative Example 5 (left-hand side), in the case where an ionic compound was introduced.

TABLE 2-1

| | Conductive resin | Dopant | Solubility in solvent | | | | | | | Stability to ion pair | | |
|---|---|---|---|---|---|---|---|---|---|---|---|---|
| | | | Toluene | CyPN | MEK | PGM | MeOH | IPA | Mixed solvent | LiI | MPII | LiBF4 |
| Ex. 1 | aniline | Prep. Ex. 1 | ○ | ○ | X | X | X | X | ○ | ○ | ○ | ○ |
| Ex. 2 | pyrrole | Prep. Ex. 1 | X | ○ | ○ | X | X | X | X | ○ | ○ | ○ |
| Ex. 3 | anisidine | Prep. Ex. 1 | ○ | ○ | ○ | X | X | X | ○ | ○ | ○ | ○ |
| Ex. 4 | PEDOT | Prep. Ex. 2 | X | X | ○ | ○ | ○ | X | X | ◎ | ◎ | ◎ |
| Ex. 5 | pyrrole | Prep. Ex. 2 | X | ○ | ○ | X | ○ | X | X | ○ | ○ | ○ |
| Ex. 6 | anisidine | Prep. Ex. 2 | X | ○ | ○ | X | X | X | X | ○ | ○ | ○ |
| Ex. 7 | PEDOT | Prep. Ex. 3 | X | X | X | X | ○ | ○ | X | ◎ | ◎ | ◎ |
| Ex. 8 | PEDOT | Prep. Ex. 4 | X | ○ | ○ | ○ | ○ | ○ | X | ◎ | ◎ | ◎ |
| Ex. 9 | pyrrole | Prep. Ex. 4 | X | ○ | ○ | ○ | ○ | ○ | X | ◎ | ◎ | ◎ |
| Ex. 10 | anisidine | Prep. Ex. 4 | ○ | ○ | ○ | ○ | ○ | ○ | ○ | ◎ | ◎ | ◎ |
| Ex. 11 | aniline | Prep. Ex. 5 | ○ | ○ | X | ○ | X | X | ○ | ○ | ○ | ○ |
| Ex. 12 | aniline | Prep. Ex. 6 | ○ | ○ | X | X | X | X | ○ | ○ | ○ | ○ |
| Comp. Ex. 1 | PEDOT | Prep. Ex. 7 | X | X | X | X | X | X | X | X | X | X |
| Comp. Ex. 2 | pyrrole | Prep. Ex. 8 | X | X | X | X | ○ | ○ | X | X | ○ | Δ |

TABLE 2-1-continued

| | Conductive resin | Dopant | Solubility in solvent | | | | | | | Stability to ion pair | | |
|---|---|---|---|---|---|---|---|---|---|---|---|---|
| | | | Toluene | CyPN | MEK | PGM | MeOH | IPA | Mixed solvent | LiI | MPII | LiBF4 |
| Comp. Ex. 3 | anisidine | Prep. Ex. 9 | ○ | Δ | X | X | X | X | ○ | X | Δ | X |
| Comp. Ex. 4 | PEDOT | Prep. Ex. 10 | X | X | X | X | ○ | ○ | X | ◎ | ◎ | ◎ |
| Comp. Ex. 5 | aniline | Prep. Ex. 11 | ○ | X | X | X | X | X | ○ | X | X | X |

TABLE 2-2

| | Conductive resin | Dopant | Coating film uniformity (ion pair: absent) | Coating film uniformity (ion pair: present) | Resistance value (ion pair: absent) |
|---|---|---|---|---|---|
| Ex. 1 | aniline | Prep. Ex. 1 | ◎ | ○ | 500k Ω |
| Ex. 2 | pyrrole | Prep. Ex. 1 | ○ | ○ | 90k Ω |
| Ex. 3 | anisidine | Prep. Ex. 1 | ◎ | ○ | 800k Ω |
| Ex. 4 | PEDOT | Prep. Ex. 2 | ○ | ○ | 70k Ω |
| Ex. 5 | pyrrole | Prep. Ex. 2 | ○ | ○ | 80k Ω |
| Ex. 6 | anisidine | Prep. Ex. 2 | ◎ | ○ | 650k Ω |
| Ex. 7 | PEDOT | Prep. Ex. 3 | ○ | ○ | 5k Ω |
| Ex. 8 | PEDOT | Prep. Ex. 4 | ◎ | ○ | 100k Ω |
| Ex. 9 | pyrrole | Prep. Ex. 4 | ◎ | ○ | 260k Ω |
| Ex. 10 | anisidine | Prep. Ex. 4 | ◎ | ○ | 870k Ω |
| Ex. 11 | aniline | Prep. Ex. 5 | ◎ | ○ | 50k Ω |
| Ex. 12 | aniline | Prep. Ex. 6 | ◎ | ○ | 20k Ω |
| Comp. Ex. 1 | PEDOT | Prep. Ex. 7 | X X | X | ∞ |
| Comp. Ex. 2 | pyrrole | Prep. Ex. 8 | X | X X | 1M |
| Comp. Ex. 3 | anisidine | Prep. Ex. 9 | ○ | X | 70k Ω |
| Comp. Ex. 4 | PEDOT | Prep. Ex. 10 | ○ | X X | ∞ |
| Comp. Ex. 5 | aniline | Prep. Ex. 11 | ○ | X | 420k Ω |

Meanings of the symbols in Table 2-1 and Table 2-2 are as follows.
PEDOT: 3,4-ethylenedioxythiophene
CyPN: cyclopentanone
MEK: methyl ethyl ketone
PGM: propylene glycol monomethyl ether
MeOH: methanol
IPA: isopropyl alcohol
Mixed solvent: toluene/PGM (8:2, by weight)
LiI: lithium iodide
MPII: 1-methyl-3-propylimidazolium iodide

The invention claimed is:

1. A conductive polymer composition comprising a polymer compound (A) and a π-conjugated polymer (β), wherein the polymer compound (A) is a polymer compound obtained by polymerizing 10 to 50% by mol of a monomer (a-1) having a sulfonic acid group or a sulfonate group, 10 to 70% by mol of a monomer (a-2) having chelating ability and 15 to 70% by mol of other monomer (a-3), the total amount of said monomers (a-1) to (a-3) being 100% by mol, wherein the monomer (a-2) having chelating ability is a monomer having a group represented by the following formula (IV) or a group represented by the following formula (V), the other monomer (a-3) is at least one monomer selected from the group consisting of a monomer (a-3-1) having a hydrophilic group and a polymerizable vinyl group, a monomer (a-3-2) having an aromatic group or an alicyclic group and a polymerizable vinyl group, and a monomer (a-3-3) having an alkyl group and a polymerizable vinyl group, and the π-conjugated polymer (β) is a π-conjugated polymer obtained by polymerizing at least one monomer selected from monomers represented by the following formulas (I) to (III):

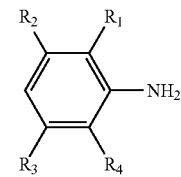
(I)

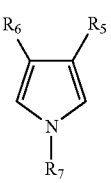
(II)

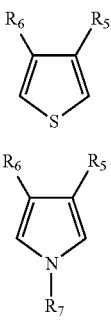
(III)

wherein $R_1$ to $R_6$ are each independently a hydrogen atom, an alkyl group of 1 to 12 carbon atoms or an alkoxy group of 1 to 10 carbon atoms, $R_7$ is a hydrogen atom, an alkyl group of 1 to 12 carbon atoms or an aromatic group, and $R_5$ and $R_6$ may be bonded to each other to form an alkylenedioxy group of 1 to 8 carbon atoms,

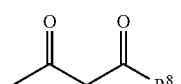
(IV)

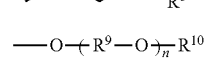
(V)

wherein $R^8$ is an alkyl group of 1 to 4 carbon atoms, $R^9$ is an ethylene group, $R^{10}$ is an alkyl group of 1 to 4 carbon atoms, and n is an integer of 1 to 5.

2. The conductive polymer composition as claimed in claim 1, which is obtained by doping the π-conjugated polymer (β) with the polymer compound (A).

3. The conductive polymer composition as claimed in claim 2, which is obtained by polymerizing at least one monomer selected from the monomers represented by the formulas (I) to (III) in an electrolytic solvent in the presence of the polymer compound (A) and an oxidizing agent to form the π-conjugated polymer (β) and to simultaneously dope the π-conjugated polymer (β) with the polymer compound (A).

4. The conductive polymer composition as claimed in claim 3, wherein the other monomer (a-3) contains a (meth)acrylic structure.

5. The conductive polymer composition as claimed in claim 2, wherein the other monomer (a-3) contains a (meth)acrylic structure.

6. The conductive polymer composition as claimed in claim 1, wherein the other monomer (a-3) contains a (meth)acrylic structure.

7. A process for preparing a conductive polymer composition, comprising polymerizing at least one monomer selected from monomers represented by the following formulas (I) to (III) in an electrolytic solvent in the presence of a polymer compound (A), which is obtained by polymerizing 10 to 50% by mol of a monomer (a-1) having a sulfonic acid group or a sulfonate group, 10 to 70% by mol of a monomer (a-2) having chelating ability and 15 to 70% by mol of other monomer (a-3), the total amount of said monomers (a-1) to (a-3) being 100% by mol, the monomer (a-2) having chelating ability is a monomer having a group represented by the following formula (IV)or a group represented by the following formula (V), the other monomer (a-3) is at least one monomer selected from the group consisting of a monomer (a-3-1) having a hydrophilic group and a polymerizable vinyl group, a monomer (a-3-2) having an aromatic group or an alicyclic group and a polymerizable vinyl group, and a monomer (a-3-3) having an alkyl group and a polymerizable vinyl group, and an oxidizing agent to form a π-conjugated polymer (β) and to simultaneously dope the π-conjugated polymer (β) with the polymer compound (A),

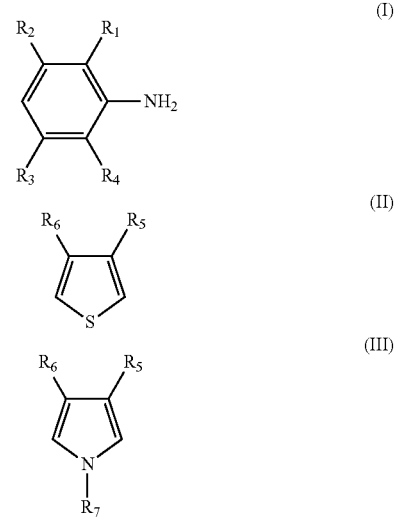

wherein $R_1$ to $R_6$ are each independently a hydrogen atom, an alkyl group of 1 to 12 carbon atoms or an alkoxy group of 1 to 10 carbon atoms, $R_7$ is a hydrogen atom, an alkyl group of 1 to 12 carbon atoms or an aromatic group, and $R_5$ and $R_6$ may be bonded to each other to form an alkylenedioxy group of 1 to 8 carbon atoms,

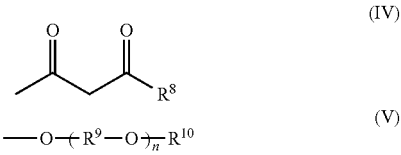

wherein $R^8$ is an alkyl group of 1 to 4 carbon atoms, $R^9$ is an ethylene group, $R^{10}$ is an alkyl group of 1 to 4 carbon atoms, and n is an integer of 1 to 5.

8. The process for preparing a conductive polymer composition as claimed in claim 7, wherein the other monomer (a-3) contains a (meth)acrylic structure.

\* \* \* \* \*